United States Patent [19]

Heiland

[11] Patent Number: 5,450,811
[45] Date of Patent: Sep. 19, 1995

[54] SIGN ASSEMBLY HAVING A PIVOTING FLAG

[76] Inventor: Jim R. Heiland, P.O. Box 737, Darby, Mont. 59829

[21] Appl. No.: 136,916

[22] Filed: Oct. 18, 1993

[51] Int. Cl.⁶ .................. E01F 9/00; G09F 17/00; B60Q 7/00
[52] U.S. Cl. .................. 116/63 R; 116/22 R; 116/173; 40/218; 40/606; 340/908; 340/473
[58] Field of Search .......... 116/22 R, 63 R, 63 P, 116/173, 174, 175; 40/218, 606, 610, 612; 248/514, 538, 520; 340/908, 908.1, 473

[56] References Cited

U.S. PATENT DOCUMENTS

| | | | |
|---|---|---|---|
| 50,382 | 10/1865 | Pell | 116/22 R |
| 2,557,859 | 6/1951 | Bernstein | 340/473 |
| 3,863,214 | 1/1975 | Kerr, Jr. | 116/63 R |
| 4,019,271 | 4/1977 | Latimer | 116/63 P |
| 4,461,234 | 7/1984 | Bounds | 116/173 |
| 5,197,408 | 3/1993 | Stoudt | 116/173 |

FOREIGN PATENT DOCUMENTS 4036467  5/1992  Germany .................. 340/908

Primary Examiner—William A. Cuchlinski, Jr.
Assistant Examiner—Andrew Hirshfeld

[57] ABSTRACT

A signalling device for warning motorists of danger including, in combination: a planar sign having a first surface with indica thereon; a housing having a top wall with a slot formed therein and a flange secured to the sign; a motor positioned within the housing, the motor having a horizontal output shaft, a disk coupled to the output shaft, the disk adapted for rotational movement, and a hole formed within the periphery of the disk; a generally vertically extending flag pole having an upper extent and a lower extent, the lower extent being pivotally connected to the bottom wall of the housing, the flag pole adapted for cyclic pivotal movement, a horizontal hole formed adjacent to the lower extent of the flag pole, the flag pole being positioned such that it extends through the slot of the housing, the upper extent of the flag pole extending above the housing and the top portion of the sign; an s-shaped pin having a first end and a second end, the first end positioned within the hole formed adjacent to the lower extent of the flag pole, the second end positioned within the hole of the disk, the pin adapted to translate the rotational movement of the disk into the cyclical pivotal movement of the flag pole.

2 Claims, 3 Drawing Sheets

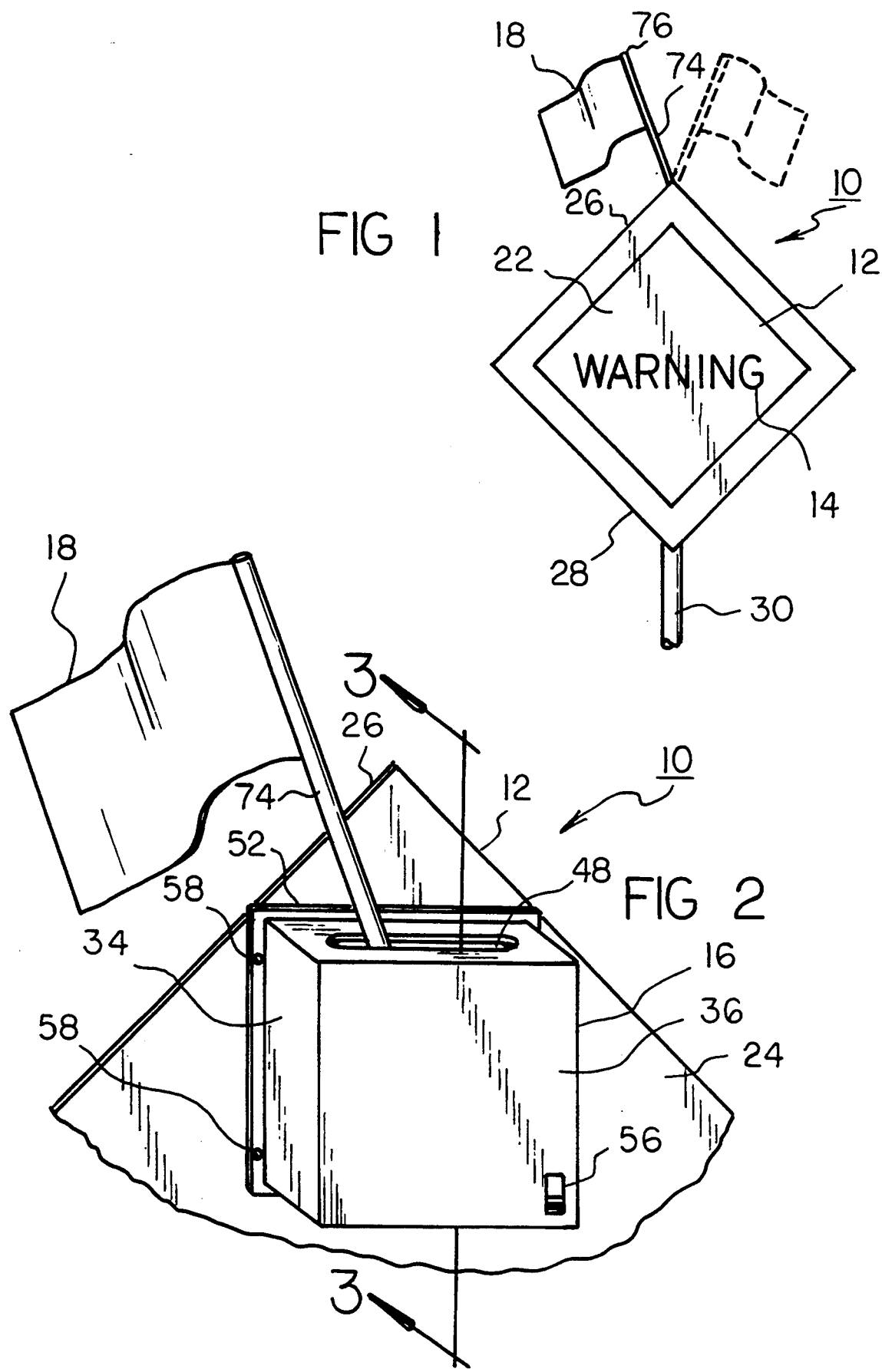

SIGN ASSEMBLY HAVING A PIVOTING FLAG

BACKGROUND OF THE INVENTION

1. Field of the Invention

The present invention relates to a signalling device and more particularly pertains to such a device which draws attention to a street sign.

2. Description of the Prior Art

The use of signalling devices is known in the prior art. More specifically, waving machines heretofore devised and utilized for the purpose of waving a flag are known to consist basically of familiar, expected and obvious structural configurations, notwithstanding the myriad of designs encompassed by the crowded prior art which have been developed for the fulfillment of countless objectives and requirements.

For example, U.S. Pat. No. 4,461,234 to Bounds discloses a flag waving machine. The machine is adapted to wave a flag in a figure 8 pattern.

U.S. Pat. No. 3,997,993 to Flanerty discloses a flag waving unit. The unit is designed to support a flag and cause it to flutter.

U.S. Pat. No. 3,477,161 to Drexler discloses a flag holder. The holder employs a powered belt and pulley system.

U.S. Pat. No. 3,995,580 to Serrone discloses a flag waving device. The device is provided for displaying a flag in a waving condition.

U.S. Pat. No. 5,042,419 to Bianco discloses a portable signalling device. The device includes a housing having a longitudinal opening for supporting a signal support.

Finally, U.S. Pat. No. 3,645,026 to Lorch discloses an articulated flag construction. The flag construction includes a mobil like assembly of rectangular planar members.

The signalling device according to the present invention substantially departs from the conventional concepts and designs of the prior art, and in so doing provides a flag waving device adapted to draw attention to a street sign.

It can be appreciated that there exists a continuing need for new and improved tools which can be used in hanging doors. In this regard, the present invention substantially fulfills this need.

SUMMARY OF THE INVENTION

In view of the disadvantages inherent in the known types of signalling devices now present in the prior art, the present invention provides an improved signalling device. As such, the general purpose of the present invention, which will be described subsequently in greater detail, is to provide a new and improved signalling device which has all the advantages of the prior art and none of the disadvantages.

To attain this, the present invention essentially comprises of a signalling device for warning motorists of danger comprising, in combination: a planar sign having a first surface, a second surface, a top portion and a bottom portion with indicia formed upon the first surface; a housing having a front wall, a rear wall, a bottom wall, a top wall, and two side walls with a slot formed within the top wall and a flange positioned about the rear wall and a switch formed within the front wall of the housing with the rear wall being secured to the second surface of the sign by way of the flange; a motor positioned within the housing, the motor being operatively coupled to the switch, the switch serving to control the operational state of the motor, the motor having a horizontal output shaft, a disk coupled to the output shaft, the disk adapted for rotational movement, and a hole formed within the periphery of the disk; a battery positioned within the housing, the battery being operatively coupled to, and adapted to provide power to, the motor; a generally vertically extending flag pole having an upper extent and a lower extent, the lower extent being pivotally connected to the bottom wall of the housing, the flag pole adapted for cyclic pivotal movement, a horizontal hole formed adjacent to the lower extent of the flag pole, the flag pole being positioned such that it extends through the slot of the housing, the upper extent of the flag pole extending above the housing and the top portion of the sign; an s-shaped pin having a first end and a second end, the first end positioned within the hole formed adjacent to the lower extent of the flag pole, the second end positioned within the hole of the disk, the pin adapted to translate the rotational movement of the disk into the cyclical pivotal movement of the flag pole; and a flexible flag mounted to the upper extent of the flagpole for waving upon the powering of the motor and movement of the flag pole.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved signalling device which has all the advantages of the prior art signalling devices and none of the disadvantages.

It is another object of the present invention to provide a new and improved signalling device which may be easily and efficiently manufactured and marketed.

It is a further object of the present invention to provide a new and improved signalling device which is of a durable and reliable construction.

An even further object of the present invention is to provide a new and improved signalling device which is susceptible of a low cost of manufacture with regard to both materials and labor, and which accordingly is then susceptible of low prices of sale to the consuming public, thereby making such signalling devices economically available to the buying public.

Still another object of the present invention is to provide a new and improved signalling device with a sign component and flag waving component.

Yet another object of the present invention is to provide a new and improved signalling device with a flag waving component wherein the flag waving component is controlled by a switch.

Even still another object of the present invention is to improve highway safety by drawing the attention of motorists to signs.

Lastly, it is an object of the invention to provide a signalling device comprising: a planar sign having a first surface, a second surface, a top portion and a bottom portion with indica formed upon the first surface; a housing having a front wall, a rear wall, a bottom wall, a top wall, and two side walls with a slot formed within the top wall and a flange positioned about the rear wall and a switch formed within the front wall of the housing with the rear wall being secured to the second surface of the sign by way of the flange; a motor positioned within the housing, the motor being operatively coupled to the switch, the switch serving to control the operational state of the motor, the motor having a horizontal output shaft, a disk coupled to the output shaft, the disk adapted for rotational movement, and a hole formed within the periphery of the disk; a battery positioned within the housing, the battery being operatively coupled to, and adapted to provide power to, the motor; a flag pole having an upper extent and a lower extent, the lower extent being pivotally connected to the bottom wall of the housing, the flag pole adapted for cyclic pivotal movement, the flag pole being positioned such that it extends through the slot of the housing, the upper extent of the flag pole extending above the housing and the top portion of the sign; means for translating the rotational movement of the disk into the cyclic pivotal movement of the flag pole; and a flag mounted to the upper extent of the flag pole.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a front elevational view of the signalling device in accordance with the present invention.

FIG. 2 is a rear perspective view of the housing of the flag waving component.

DESCRIPTION OF THE PREFERRED EMBODIMENT

Figure 3:
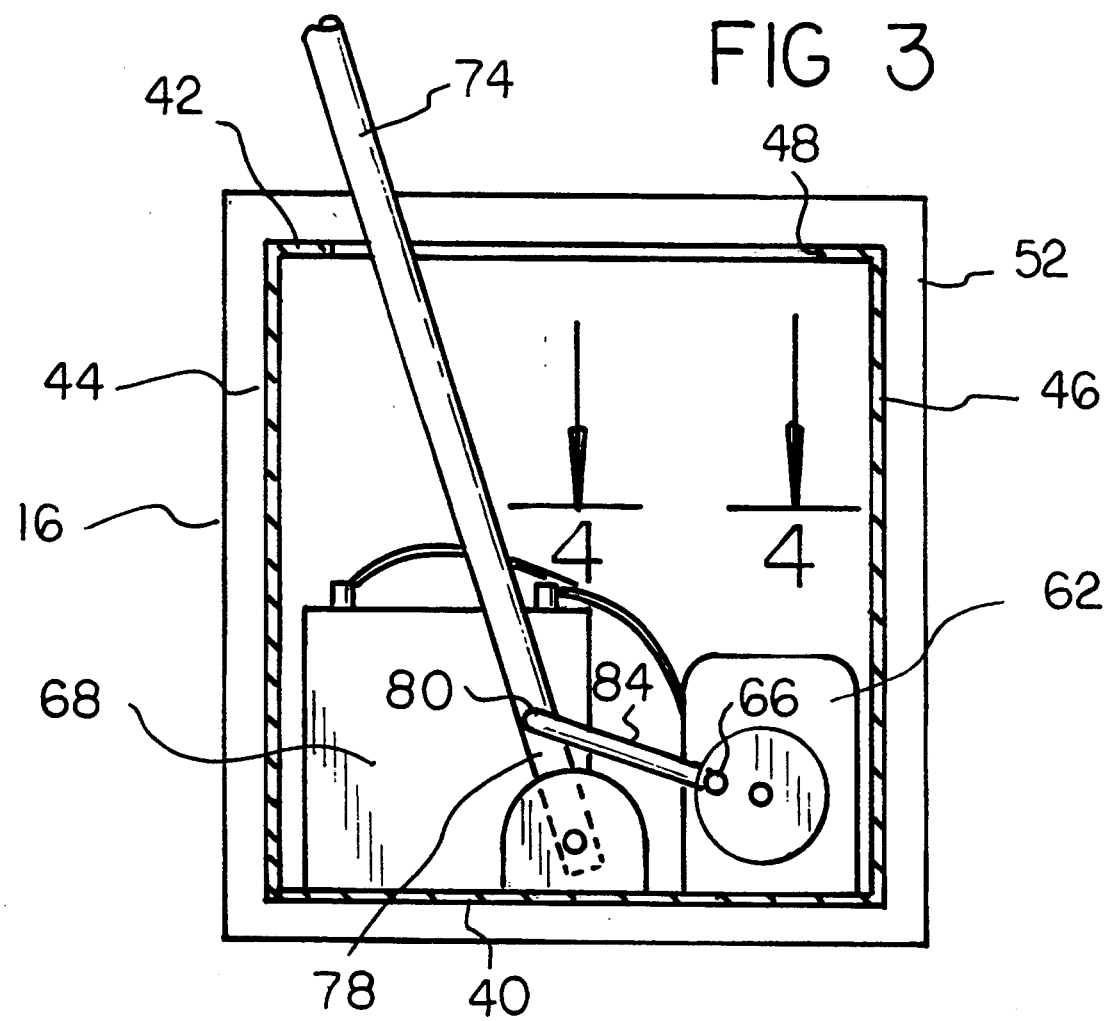
FIG. 3 is a sectional view taken along lines 3—3 of FIG. 2.
Figure 4:
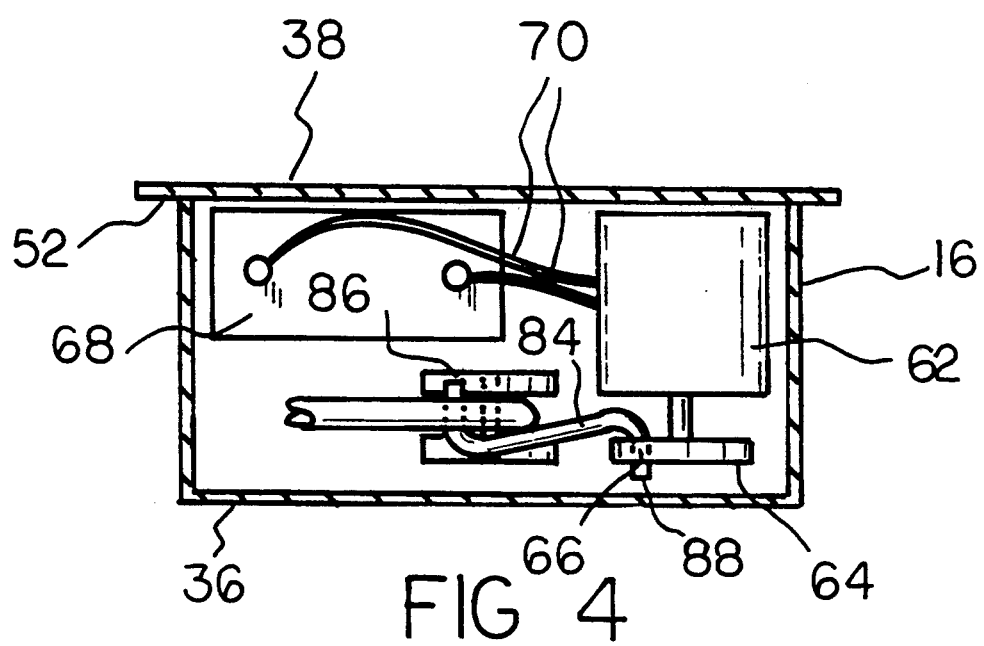
FIG. 4 is a sectional view taken along line 4—4 of FIG. 3.
Figure 5:
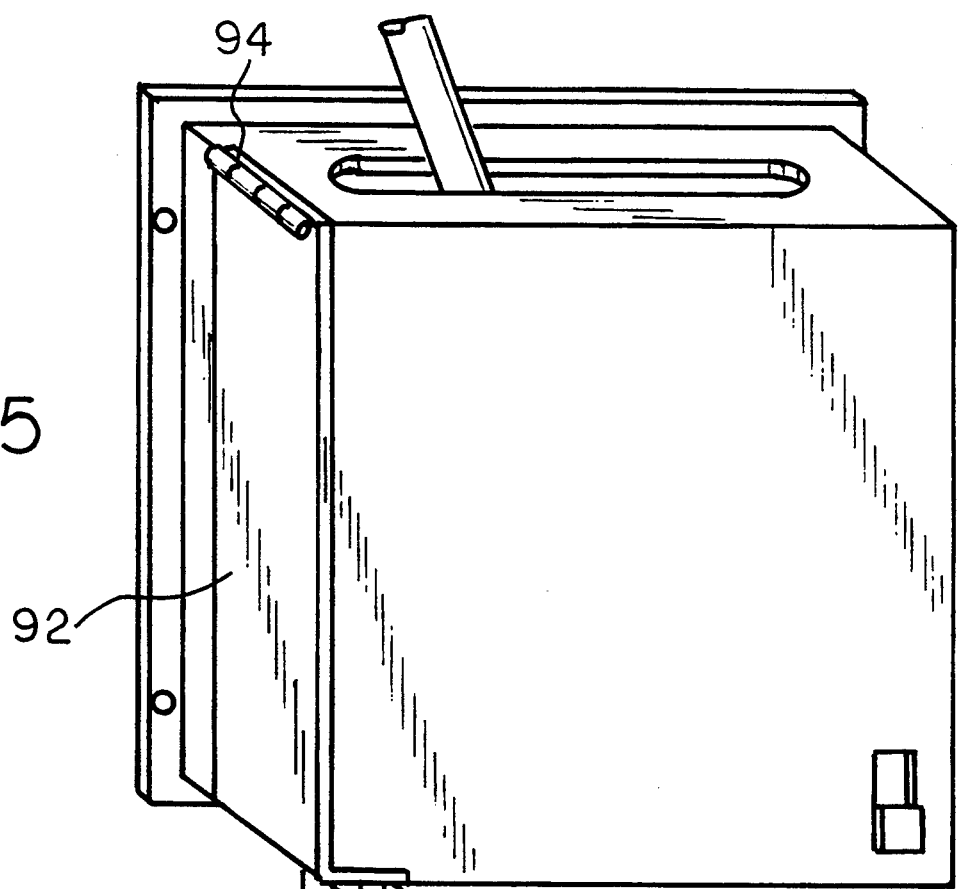
FIG. 5 is a rear perspective view of the housing in accordance with the second embodiment of the present invention.
Figure 6:
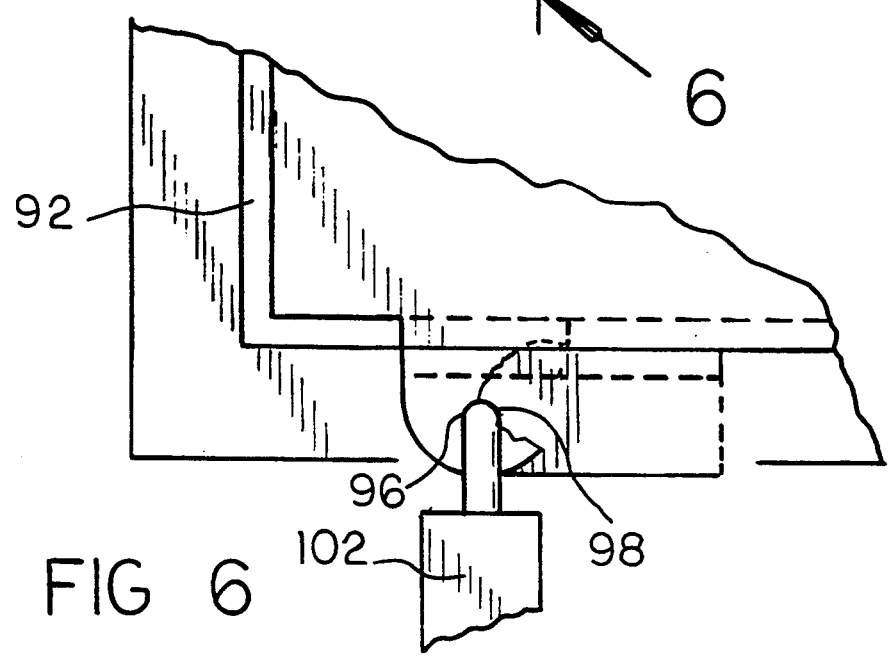
FIG. 6 is an enlarged view taken along line 6—6 of FIG. 5.

With reference now to the drawings, and in particular to FIG. 1 thereof, a new and improved signalling device embodying the principles and concepts of the present invention and generally designated by the reference numeral 10 will be described.

More specifically, it will be noted that the present invention relates to a signalling system 10. The signalling system is designed to be used on a roadside to warn motorists of an upcoming hazard. The signalling device has two major components. The first component is the sign 12. The sign is of a conventional construction and serves to convey a message to motorists through indicia 14 such as a word or symbol. The second component is the flag waving device 16. The flag waving device 16 serves to wave a warning flag 18 above the sign. Thus, the flag serves to bring attention to the sign and the indicia. The components of the present invention will be described in greater detail hereafter.

As can be seen in FIG. 1, the sign 12 is of a conventional structure. The sign is planar and has a first surface 22, a second surface 24, a top portion 26 and a bottom portion 28. The sign of the present invention can be of any geometric shape. Furthermore, the sign can be positioned at any height above the ground by way of a mounting pole 30. The shape however should conform to existing conventions. By way of example, stop signs are generally octahedral in shape and warning signs are generally diamond shaped, as shown in FIGS. 1 and 2. Furthermore, the sign includes indica 14 formed upon its first surface 22. The indica should relate to a passer by an appropriate message.

The elements that make up the flag waving device are positioned in a housing 34. The housing includes a front wall 36, a rear wall 38, a bottom wall 40, a top wall 42 and two side walls 44 and 46. A slot 48 is formed within the top wall of the housing, Furthermore, a flange 52 is positioned about the rear wall 38 of the housing 34.

A switch 56 is formed within the front wall 36 of the housing. The purpose of the switch will be described more fully hereafter. The rear wall is secured to the second surface of the sign by way of the flange. The flange securement is achieved by way of screws 58, rivets or the like.

One of the elements of the flag waving device is a motor 62. The motor is positioned within the housing and is operatively coupled to the switch 56 of the housing. The switch serves to control the operational state of the motor. The switch includes both an on and off position, note FIG. 2. Furthermore, the switch may employ intermediate settings such as fast and slow. The motor includes an output shaft and a disk 64 coupled to the output shaft. The disk is adapted for rotational movement. Additionally, a hole 66 is formed within the periphery of the disk. The purpose of the hole will be described fully hereafter.

Another element of the flag waving device is a battery 68. The battery is positioned within the housing adjacent the motor. The battery 68 is operatively coupled to the motor 62 by wires 70 and adapted to provide power to the motor. Both the motor and the battery are of a conventional construction, however, they should be of a size to readily fit within the housing.

The flag pole 74 of the present invention includes an upper extent 76 and a lower extent 78. The lower extent of the pole is pivotally connected to the bottom wall of the housing about a horizontal axis. The flag pole is adapted to be positioned generally vertically and for cyclic pivotal movement. A hole 80 is formed adjacent to the lower extent of the flag pole, the purpose of the hole will be described in greater detail hereafter. The flag pole 74 is positioned such that it extends through the slot 48 of the housing with the upper extent of the flag pole extending above the housing and the top portion of the sign.

A flag 18 is secured to the upper extent of the flag pole for waving during operations and use. The flag should be of a color that aids in drawing attention to the sign. Furthermore, the flag can employ indicia on one or more of its surfaces.

Still yet another element of the flag waving device 10 is an s-shaped pin 84. The s-shaped pin 84 includes a first end 86 and a second end 88. The first end 86 of the pin is positioned within the hole 80 formed adjacent to the lower extent of the flag pole 74. The second end 88 of the pin is positioned within the hole 66 of the disk 64. Thus, the pin is adapted to translate the rotational movement of the disk into the cylindrical pivotal movement of the flag pole.

Thus, in use an operator selects the operational state of the flag waving device. When the switch 56 is positioned to the "on" state, the flag 18 begins to pivot back and forth through a vertical orientation passing along the slot within the top wall of the housing. This pivotal movement of the flag serves to draw attention of motorists to the sign.

The signalling device of the second embodiment of the present invention is substantially similar to that of the first. The signalling device of the second embodiment has one of the side walls of the housing in the form of an L-shaped cover 92. The cover includes a first end and a second end. The first end of the cover is attached to the top wall of the housing by a hinge 94. Furthermore, the second end of the cover includes an apertured protrusion 96. A corresponding apertured protrusion 98 is formed upon the bottom wall of the housing. The apertured protrusion of the cover is adapted to align with the apertured protrusion of the housing. A lock 102 is adapted to be received through both apertured protrusions. The locking means serves to prevent unauthorized access to the interior of the housing. When unlocked, however, access to the interior of the device is accessible for maintenance and/or repair.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by LETTERS PATENT of the United States is as follows:

1. A signalling device for warning motorists of danger comprising, in combination:

a planar sign having a first surface, a second surface, a top portion, a bottom portion, indicia formed upon the first surface, and a mounting pole extending downwards from the bottom portion and securable to a recipient supporting surface;

a generally box-shaped housing having a front wall, a rear wall, a bottom wall, a top wall, and two side walls with a slot formed within the top wall and a flange positioned about the rear wall and a switch formed within the front wall of the housing with the rear wall being secured to the second surface of the sign by the way of the flange;

a motor positioned within the housing, the motor being operatively coupled to the switch, the switch serving to control the operational state of the motor, the motor having a horizontal output shaft, a disk coupled to the output shaft, the disk adapted for rotational movement, and a hole formed within the periphery of the disk;

a battery positioned within the housing, the battery being operatively coupled to, and adapted to provide power to, the motor;

a generally vertically extending flag pole having an upper extent and a lower extent, the lower extent being pivotally connected to the bottom wall of the housing, the flag pole adapted for cyclic pivotal movement, a horizontal hole formed adjacent to the lower extent of the flag pole, the flag pole being positioned such that it extends through the slot of the housing, the upper extent of the flag pole extending above the housing and the top portion of the sign;

a rigid s-shaped pin having a first end and a second end, the first end positioned within the hole formed adjacent to the lower extent of the flag pole, the second end positioned within the hole of the disk, the pin adapted to translate rotational movement of the disk into the cyclical pivotal movement of the flag pole; and a flexible rectangular flag mounted to the upper extent of the flag pole for waving upon the powering of the motor and movement of the flag pole.

2. A signalling device comprising:

a planar sign having a first surface, a second surface, top portion, and a bottom portion with indicia formed upon the first surface;

a housing having a front wall, a rear wall, a bottom wall having an apertured protrusion formed thereon, a top wall, and two side walls, the housing further having a slot formed within the top wall, a flange positioned about the rear wall, and a switch formed within the front wall of the housing with the rear wall being secured to the second surface of the sign by the way of the flange, and wherein one of the side walls of the housing is an L-shaped cover having a first end and a second end with the first end of the cover being hingedly attached to the top wall of the housing and with the second end of the cover including an apertured protrusion formed thereon alignable with the apertured protrusion of the bottom wall;

locking means adapted to be received through both the apertured protrusions, the locking means serving to prevent access to the interior of the housing;

a motor positioned within the housing, the motor being operatively coupled to the switch, the switch serving to control the operational state of the motor, the motor having a horizontal output shaft, a disk coupled to the output shaft, the disk adapted for rotational movement, and a hole formed within the periphery of the disk;

a battery positioned within the housing, the battery being operatively coupled to, and adapted to provide power to, the motor;

a flag pole having an upper extent and a lower extent, the lower extent being pivotally connected to the bottom wall of the housing, the flag pole adapted for cyclic pivotal movement, a horizontal hole formed adjacent to the lower extent of the flag pole, the flag pole being positioned such that it extends through the slot of the housing, the upper extent of the flag pole extending above the housing and the top portion of the sign;

means for translating the rotational movement of the disk into the cyclic pivotal movement of the flag pole; and a flag mounted to the upper extent of the flag pole.

* * * * *